United States Patent Office 3,072,255
Patented Jan. 8, 1963

3,072,255
METHOD OF BRIGHTENING CLAY BY FROTH FLOTATION OF SULFIDIZED CLAY PULP
Ernest W. Greene, Westfield, and James B. Duke, and Joseph L. Hunter, Metuchen, N.J., assignors to Minerals & Chemicals Philipp Corporation, a corporation of Maryland
No Drawing. Filed Mar. 11, 1960, Ser. No. 14,182
3 Claims. (Cl. 209—166)

The subject invention relates to a method of froth flotation which permits appreciable brightening of clays which are difficult to brighten by other methods.

Clays are hydrated aluminum silicates in which magnesium may proxy for the aluminum. Various clay minerals are known, all of them being characterized by being very fine-grained materials.

For many applications, as in paper coating and in white or pastel paints, the value of a clay depends on its brightness. Colored impurities, usually ferruginous and titaniferous in nature, are invariably associated with sedimentary clays. As a result of the presence of colored impurities, the value of the clay is diminished since these impurities detract from the brightness of clay, even when they are present in small quantities, such as 1% to 3% of the clay weight.

Brightness of clays is frequently determined by the TAPPI method hereafter described. Many potentially valuable clays are found in nature which have a brightness index, as measured by this method, of 75% to 80% or somewhat higher. While an increment of a few percentage points in brightness of such a clay might seem insignificant, the fact is that a clay having a brightness index of 85% or more is considerably more useful than a clay having a brightness index of 80%, for example. Even an increment of several percentage in brightness index represent a valuable improvement in the clay.

The titaniferous colored impurity in sedimentary clays is thought to be anatase, a yellowish, crystalline form of titania. The iron may be present in the form of one or more of its oxides. There is some indication that at least a portion of the iron content of some clays exists as a silicate or may proxy for cations in the clay lattice; at any rate the iron in some clays is not readily removable by chemical methods which are effective in removing iron compounds from other clays.

To improve the brightness of sedimentary clays adapted for use as a pigment in paper coating and light colored or white paints, etc., the clay is beneficiated to some extent by one, and sometimes a plurality, of techniques. Commercial methods of improving the brightness of clay may be broadly grouped as follows: chemical bleaching methods, the most commonly used being hydrosulfite bleaching which operates to reduce iron contaminants in the clay to soluble ferrous compounds but which has little effect on the titanium content; electrophoretic refinement, as by an asmotic apparatus; and controlled sedimentation to isolate the fine brighter fraction of the clay. Some highly effective methods of brightening clay involve subjecting clay to elevated temperatures at which the clay loses water of crystallization. However, as a result of this, the flow properties of a slip of the clay are undesirably altered and the clay may be useless for many of its important applications. For example, high temperature (e.g., 1400° F.) sulfidization of kaolin clay followed by acid leaching of the sulfidized clay has been recommended to reduce the iron content of the clay. The clay is significantly dehydrated by such procedure. Inasmuch as rehydration of the clay is difficult, the resultant product, although low in iron, is unsuited for use in paper coating and the like.

In addition to the above procedures, froth flotation has been advocated as a method of brightening clay. U.S. 2,894,628 to James B. Duke, an inventor in the present application, has to do with a method of beneficiating clay by froth flotation of kaolin clay utilizing an anionic collector which is selective to colored impurities in the clay so that brightened clay is recovered in the tailings. Excellent yields of brightened clay are realized in many instances through the use of the aforementioned froth flotation procedure, or this procedure in combination with chemical bleaching. Nevertheless, certain clays fail to respond to a satisfactory extent to the treatment in terms of recovery of beneficiated clay and/or degree of brightening. For example, the procedure is particularly applicable to coarse fractions of clay from which a substantial portion of particles finer than 2 microns have been removed. The method loses much of its effectiveness when whole clay or fine fractions of clay feed are treated since the minus 2 micron material in such clays apparently hinders effective flotation. In many instances the fine fraction of clay is of particular utility, especially when it is bright. As a result, a process which fails to beneficiate the fine fraction of clay frequently leaves much to be desired.

So-called "gray kaolin" clay exemplifies a sedimentary clay which fails to brighten appreciably by hydrosulfite or other beneficiation methods. Gray kaoline clay is readily distinguished from other kaolins by its distinct gray coloration which is different from the apparently white or sometimes orange-tinged kaolin clays used for coating paper or as pigments or extenders in plastics. It might be logical to expect that gray kaolin could readily be distinguished from white kaolin clay on the basis of chemical analysis. This, however, is not the case, for there exist kaolin clays of substantially identical chemical analysis, inclusive of iron, titania and carbon content; nevertheless, one clay will be distinctly gray and the other one white. There is good reason to believe that the iron in these two clays, or a portion of the iron, is present in a different condition. Extensive gray kaolin deposits frequently are associated with white clay deposits. The gray kaolin represents in most instances an economic loss since there is little market for such clay, and no practical method has been advanced which affords a means of appreciably improving the brightness of the clay.

A principal object of my invention is to provide a method of brightening those discolored clays which are not appreciably brightened by prior art methods for brightening clays.

A more particular object of my invention is the provision of a low temperature method of brightening gray kaolin clay to an extent not attainable by prior art clay brightening methods.

Another object of our invention is the provision of a novel method of beneficiating clay by froth flotation, which method is applicable to whole clay and fine fractions thereof, as well as to coarse fractions of the clay.

A more particular object of our invention is to provide a novel froth flotation method particularly suitable for beneficiating those discolored clays which fail to respond to the desired extent to known methods of beneficiating clays by froth flotation, even in combination with hydrosulfite bleaching.

We have found an effective method of brightening many discolored sedimentary clays, particularly kaolin clays, which fail to respond to other brightening methods.

Briefly stated, the method of the present invention involves the froth flotation of a sulfidized aqueous pulp of dispersed clay, the froth flotation being carried out using the following combination of flotation reagents: (1) a negative-ion collector reagent capable of selectively oiling colored impurities in the clay, and (2) finely divided particles of a solid material capable of floating in the reagentized pulp. The latter will hereafter be referred to as "auxiliary particles" to distinguish them from particles indigenous to the clay feed. In accordance with one embodiment of the invention, the latter reagent consists of finely divided, collector-coated mineral particles, e.g., oiled calcite. This embodiment of the method of the invention is subject to numerous variations, e.g., the sulfidized clay feed may be reagentized with the same reagents as the auxiliary particles, simultaneously or independently, this depending on the relative affinity for the reagents of the solids being treated. However, when the choice of auxiliary mineral is such that it cannot be rendered collector coated by the reagent or reagents used to render the colored impurities of the feed water-repellent, then the reagentization of the auxiliary mineral is usually independent of the reagentization of the feed.

During the concentration of the blackened sulfidized pulp, the pulp lightens in color and the auxiliary solid particles report in the froth product and, in so doing, apparently induce or promote the flotation of those oiled colored impurities of the clay which are difficult to float in the absence of such auxiliary particles. The machine discharge product is clay of enhanced purity and brightness. The beneficiated clay product is useful in those applications in which such characteristics are valued, e.g., in coating colors and white or pastel paints.

The discovery that froth flotation of colored impurities from certain clays utilizing an auxiliary finely divided solid reagent would be significantly improved by initially sulfidizing the clay pulp was indeed surprising and unexpected. In fact, the present invention resulted from the unintentional introduction of $H_2S$ contaminated water to clay which was intended for a froth flotation experiment. The discovery was particularly surprising in view of the fact that it was found that an improved yield of beneficiated clay was obtained as well as a substantial reduction in the proportion of titania in the beneficiated clay.

The degree of response of different clays to sulfidization prior to flotation will vary from clay to clay. Particular benefits are realized using gray kaolin clay.

Our invention will be more readily understood by the following detailed description.

In carrying out the method of the present invention, an aqueous pulp of dispersed clay is initially provided, the pulp having a soluble sulfide, such as $H_2S$, $Na_2S$, or a solution of calcium sulfide in caustic soda, incorporated therein. Also incorporated in the pulp is a dispersing or deflocculating agent for the clay, such as, for example, sodium silicate or tetrasodium pyrophosphate. The sulfidizing agent may be added to a previously prepared deflocculated clay slip or water having an appreciable soluble sulfide content may be used in slipping the clay. The sulfide must be present in the clay slip in amount sufficient to blacken the slip. The solids content of the sulfidized pulp is usually maintained as high as possible to facilitate efficient conditioning with the flotation reagents.

A convenient method for providing a sulfidized dispersed clay pulp is to prepare a 6 to 25% solids clay pulp dispersed with sodium silicate, for example, and bubble $H_2S$ into the dispersed pulp until the slip acquires a distinctly black color. When available, the sulfide may be supplied by pulping the clay with water which has an appreciable native $H_2S$ content. The origin of $H_2S$ in some bodies of water, e.g., "sulfur spring" water, is at least partly due to the bacterial reduction of mineral sulfates. Frequently $H_2S$ is present in some water as a bacterial decomposition product of protein, particularly animal protein. Any body of water containing $H_2S$ may be used.

The aqueous clay pulp is contacted with the water soluble sulfidizing agent at about ambient temperature and the pulp is aged for at least sufficient time to permit sulfidization of colored impurities in the clay, as evidenced by a marked blackening of the clay pulp, probably attributable to the formation of FeS and possibly sulfides of titanium. The dark color of the pulp disappears when the pulp is aerated.

The sulfidized pulp is neutralized and then conditioned with any negative-ion collector reagent capable of selectively oiling the colored impurities in the clay by coating these particles with an oriented hydrophobic film. Higher fatty acids such as oleic acid are particularly suitable collectors. Other collectors include tall oil fatty acids, resin acids, sulfonates of these and like acids, such as sulfo-oleic acid, and soluble soaps of the aforementioned acids. The negative-ion reagent may comprise one or more of the above collectors. Our flotation process is carried out in an alkaline circuit, preferably at a pH within the range of 8 to 10. Ammonium hydroxide, sodium hydroxide or other alkaline material is added to the pulp to bring the pH to the desired level. A frothing agent may be used when necessary. Preferably a material selected from the group consisting of oil-soluble, water-insoluble petroleum sulfonates and neutral hydrocarbon oils and mixtures thereof is used to improve the collection by the fatty acid collector. Suitable hydrocarbon oils include white mineral oil and kerosene. Petroleum sulfonates are prepared by sulfonation, usually with concentrated or fuming sulfuric acid, of certain petroleum fractions and are commercially available in form of sodium, calcium, barium, and ammonium salts, neutral or not neutral, and of varying solubility properties dependent on the molecular weight. It has been found that the collection of colored impurities in kaolin clay is facilitated by those petroleum sulfonates which are water-insoluble and oil-soluble, these usually being available in the form of a solution in a substantial volume of mineral oil. The water-soluble petroleum sulfonates do not operate in the same manner as the oil-soluble petroleum sulfonates and they often contribute to excessive frothing during the flotation unless they are used in carefully controlled quantities. Also, preferably we incorporate in the pulp a material selected from the group consisting of ammonium sulfate, magnesium sulfate and potassium sulfate, which also improves the collection.

As has been brought out hereinabove, an essential feature of the present method is the conditioning of the clay feed by incorporation in the sulfidized dispersed clay pulp of finely divided solids particles, floatable in the reagentized pulp. These particles may be materials which are sometimes called "natural floaters," such as finely divided elemental sulfur, charcoal, graphite or like carbonaceous matter, and powdered wax. Such particles may be added to the sulfidized pulp before, simultaneously with or subsequent to addition of the collector and other flotation reagents. In accordance with another form of the invention, such finely divided auxiliary solids are collector coated minerals. In the latter event reagentization of the auxiliary mineral may be simultaneously with or independently of the reagentization of the clay. At any rate the reagentized mineral particles must be thoroughly admixed with the sulfidized clay feed prior to concentration.

In those instances where the auxiliary mineral is of a character such that it may be reagentized with the same reagents utilized for treating the clay feed, the process is simple and requires merely the presence of the auxiliary mineral in the pulp of the clay feed during the reagentizing step. In such a case, the quantity of reagents employed must be adjusted to provide not only for floating the colored impurities in the clay pulp but also for floating the auxiliary mineral. In some instances, even when the reagents are the same for feed and auxiliary mineral, it will be desirable to reagentize feed and auxiliary mineral separately and then admix the pulps of reagentized materials; an instance where such practice is indicated is when either the auxiliary mineral or feed has surface characteristics such as to preclude proper reagentizing of the other material.

As examples of suitable particulate auxiliary minerals, which when collector coated, are useful in conditioning the clay feed, may be mentioned calcite, barytes, kyanite, silica sand, marble, magnetite and fluorspar. Auxiliary minerals may be uni- or multi-component materials or may be mineral admixtures. Suitable reagents for floating the auxiliary minerals above-specified are described in Taggart, Handbook of Mineral Dressing 12, 116–120 (1950 Edition), or may be experimentally determined. It will be readily apparent to those skilled in the froth flotation art that any mineral which may be appropriately conditioned for flotation in the presence of the reagentized kaolin pulp is within the compass of our invention.

The particle size of the particulate auxiliary material may vary within a relatively wide range, which, of course, must lie within the range of particles floatable in the presence of the reagentized clay. It has been our experience, however, that generally particles somewhat finer than 325 mesh may be preferred to particles coarser than 325 mesh. Excellent results have been realized using a finely divided solid, the particles of which are substantially all minus 10 microns.

The optimum proportion of auxiliary particles relative to feed solids may also vary within a wide range, the minimum amount of auxiliary mineral ordinarily exceeding that of the fraction of the feed clay which is to be floated. For example, in beneficiating a kaolin containing about 2% anatase, we may use from about 5% to 200% of auxiliary particles, based on the weight of the dry clay feed.

The reagentization may be carried out in any suitable apparatus ordinarily used for reagentizing ores and minerals, such apparatus being well-known to those skilled in the art and being fully described in the literature. It is fully within the compass of our invention to reagentize the auxiliary mineral simultaneously with the step of grinding the auxiliary mineral to a suitable grain size for the flotation process. Ordinarily, the reagents will be added to the auxiliary mineral and feed clay when they are dispersed in an aqueous medium, using a dispersant when necessary. As is usually the case with collector reagents used in our process, the reagentization steps are carried out under alkaline conditions.

Preferably subsequent to the reagentization of the feed and the auxiliary mineral particles, the pulp is subjected to aeration (and usually mechanical agitation) in any suitable flotation cell. In some instances it may be advantageous to add additional reagents during the concentration step. As a result of the aeration, the colored impurities, collector coated, are carried upward into the froth in association with the auxiliary particles and the composited froth is separated from the tailings or machine discharge product which comprises beneficiated clay. The beneficiated clay product is characterized by an enhanced whiteness and brightness and a reduced titania analysis.

In some cases the beneficiated clay may be further brightened to some extent by chemical bleaching.

The following examples are given for illustrative purposes only and are not to be construed as limiting our invention to the specific materials and reagents set forth therein.

In the examples brightness index refers to values obtained by TAPPI Standard Method T–646m–54, as described on pages 159A and 160A of the October 1954 issue of TAPPI (a monthly publication of the Technical Association of the Pulp and Paper Industry). The method measures the light reflectance of a clay sample and thus gives a quantitative indication of its brightness or whiteness.

EXAMPLE I

This example illustrates the outsanding improvement in brightness of a gray kaolin by the method of the present invention. In this example the clay pulp was sulfidized with $H_2S$ and then the sulfidized pulp, together with added finely divided calcium carbonate (flotation-inducing particles) was reagentized. The clay used was one which did not respond to hydrosulfite bleaching and was not brightened by simple froth flotation in an alkaline circuit with a fatty acid collector reagent.

Crude gray kaolin clay from a deposit near McIntyre, Georgia, was crushed to pass a 4 mesh screen. The crushed clay was mixed with water. Three-tenths percent sodium silicate, based on the dry clay weight, was added and the mixture agitated with a paddle-type agitator until the clay was completely dispersed. The slurry was screened on a 325 mesh screen to remove grit and coarse agglomerates. The sample was diluted with additional water to 25% solids.

$H_2S$ gas was bubbled into the sodium silicate dispersed clay slip for 15 minutes. The resultant sulfidized slip was distinctly black.

The pH of the sulfidized slip was adjusted to a value of 7 with $NH_4OH$ (72 ml. of a 2.5% solution).

A 750 gram portion of the neutralized sulfidized clay slip was placed in a glass container and 225 grams of dry calcium carbonate hydraulically classified to a mean particle size of 2.5 microns was added to the slip. The pulp was agitated with a Fagergren flotation machine agitator. To the agitating pulp the following materials were added in the order indicated.

| Reagent: | Reagent/ton dry clay |
|---|---|
| Ammonium sulfate | 6.0 |
| Ammonium hydroxide | 2.0 |
| Crude tall oil fatty acid | ⎰ 6.2 |
| Calcium petronate[1]     Aqueous emulsion | ⎨ 6.2 |
| Ammonium hydroxide | ⎱ 1.0 |

[1] A neutral calcium salt of a sulfonated petroleum oil having the following analysis:

|  | Percent by weight |
|---|---|
| Calcium sulfonate complex | 41.0 |
| Mineral oil | 58.5 |
| Water | 0.5 |

The conditioned pulp was agitated for 17 minutes and transferred to a 1000 gram minerals separation airflow flotation machine and subjected to flotation, removing a froth product rich in $TiO_2$ for 10 minutes. The pulp remaining in the flotation machine was discharged and the froth was repulped in the flotation machine and floated for 10 minutes. The second froth was refloated producing a final froth product. The machine discharge products were combined to produce a composited final beneficiated kaolin clay product.

The results of this experiment are reported in Table I.

*Table I*

BENEFICIATION OF CLAY BY FROTH FLOTATION OF SULFIDIZED PULP USING $CaCO_3$ CARRIER REAGENT

|  | Percent Weight [1] | Percent Brightness Index | Percent $TiO_2$ |
|---|---|---|---|
| Starting Clay | 100.0 | 83.0 | 1.49 |
| Beneficiated Clay | 84.6 | 87.1 | 0.68 |

[1] Based on kaolin content.

The results show that an excellent yield of markedly brightened kaolin clay was produced. Also illustrated is that the $TiO_2$ content of the beneficiated clay was only about 45% of that of the feed.

EXAMPLE II

The procedure of Example I was duplicated with the exception that the clay slip was not treated with $H_2S$. The results are reported below.

Table II
BENEFICIATION OF CLAY BY FROTH FLOTATION OF UNSULFIDIZED PULP USING $CaCO_3$ CARRIER

|  | Percent Weight[1] | Percent Brightness Index | Percent $TiO_2$ |
|---|---|---|---|
| Starting Clay | 100.0 | 83.0 | 1.49 |
| Beneficiated Clay | 79.1 | 85.0 | 1.17 |

[1] Based on kaolin content.

The results of this experiment compared with those of the previous experiment (wherein the clay pulp was sulfidized prior to flotation) show the striking enhancement of yield and degree of beneficiation that is realized when a sulfidized pulp of clay is subjected to froth flotation using a negative-ion collector reagent for colored impurities in the clay together with collector coated particles of $CaCO_3$ in an alkaline pulp. Thus sulfidization of the pulp improved the brightness index of the product by more than 2% over that realized using unsulfidized pulp and reduced the $TiO_2$ analysis of the starting clay by more than 50%, whereas unsulfidized pulp resulted in a $TiO_2$ reduction of the clay of only about 15%. Moreover, sulfidization of the pulp improved substantially the recovery of beneficiated clay.

We claim:

1. A method of improving the brightness of gray kaolin clay comprising dispersing gray kaolin clay in water containing $H_2S$ so as to form a dispersed clay pulp, aging said pulp for a time sufficient to effect substantial blackening thereof, conditioning said pulp for froth flotation with (1) a collector reagent capable of selectively oiling colored impurities in said clay and (2) finely divided solid particles capable of floating in said pulp, and subjecting the thus-conditioned aqueous pulp to froth flotation in an alkaline circuit thereby producing a froth product which is a concentrate of colored impurities in said pulp in intimate combination with said finely divided solid particles and a machine discharge product which is a concentrate of clay of enhanced brightness.

2. A method of improving the brightness of gray kaolin clay comprising forming a dispersed aqueous pulp of gray kaolin clay, incorporating $H_2S$ in said pulp, aging said pulp to sulfidize metallic colored impurities in said clay, conditioning the sulfidized pulp for froth flotation in an alkaline circuit with (1) a fatty acid collector reagent capable of selectively oiling colored impurities in said pulp and (2) finely divided solid particles capable of floating in said pulp, and subjecting the thus-conditioned aqueous pulp to froth flotation in an alkaline circuit thereby to produce a froth product which is a concentrate of said finely divided solid particles in intimate combination with colored impurities in said clay and a machine discharge clay product of enhanced brightness.

3. A method of improving the brightness of gray kaolin clay comprising forming a dispersed aqueous pulp of gray kaolin clay, incorporating $H_2S$ in said pulp, aging said pulp to sulfidize metallic colored impurities in said clay, neutralizing the sulfidized pulp, conditioning the sulfidized pulp for froth flotation in an alkaline circuit with (1) a fatty acid collector reagent capable of selectively oiling colored impurities in said pulp and (2) oiled particles of an auxiliary mineral, said oiled particles being floatable in said pulp, and subjecting the thus-conditioned aqueous pulp to froth flotation in an alkaline circuit thereby to produce a froth product which is a concentrate of said finely divided solid particles in intimate combination with colored impurities in said clay and a machine discharge clay product of enhanced brightness.

References Cited in the file of this patent

UNITED STATES PATENTS

| 1,197,589 | Bacon | Sept. 12, 1916 |
| 1,838,422 | Littleford | Dec. 29, 1931 |
| 2,569,680 | Leek | Oct. 2, 1951 |
| 2,894,628 | Duke | July 14, 1959 |
| 2,990,958 | Green et al. | July 4, 1961 |

FOREIGN PATENTS

| 462,213 | Great Britain | Mar. 4, 1937 |